United States Patent
Onoda et al.

(10) Patent No.: US 7,220,191 B2
(45) Date of Patent: May 22, 2007

(54) HIGH-STRENGTH GOLF BALL

(75) Inventors: Kenji Onoda, Kashihara (JP); Masao Ogawa, Osaka (JP); Yuri Naka, Katano (JP); Norikazu Ninomiya, Osaka (JP)

(73) Assignee: Mizuno Corporation, Osaka-Shi (JP)

( * ) Notice: Subject to any disclaimer, the term of this patent is extended or adjusted under 35 U.S.C. 154(b) by 0 days.

(21) Appl. No.: 10/855,318

(22) Filed: May 28, 2004

(65) Prior Publication Data

US 2005/0020385 A1    Jan. 27, 2005

(30) Foreign Application Priority Data

May 30, 2003   (JP)   .............................. 2003-153963

(51) Int. Cl.
*A63B 37/00*   (2006.01)
(52) U.S. Cl. .................................................. 473/351
(58) Field of Classification Search ................ 473/351, 473/373, 374

See application file for complete search history.

(56) References Cited

U.S. PATENT DOCUMENTS

| | | | |
|---|---|---|---|
| 6,203,814 B1 | 3/2001 | Fisher et al. ................. 424/443 |
| 2003/0130061 A1* | 7/2003 | Rajagopalan et al. ....... 473/354 |
| 2003/0130425 A1* | 7/2003 | Takeuchi et al. ............. 525/143 |
| 2005/0059509 A1* | 3/2005 | Takesue et al. ............. 473/371 |

FOREIGN PATENT DOCUMENTS

| | | |
|---|---|---|
| JP | 2002-253703 | 9/2002 |
| WO | WO 02/09823 A1 | 2/2002 |

* cited by examiner

*Primary Examiner*—Raeann Trimiew
(74) *Attorney, Agent, or Firm*—Armstrong, Kratz, Quintos, Hanson & Brooks, LLP

(57) ABSTRACT

The present invention relates to a high-strength golf ball comprising a core having a main core and optionally a sub-core comprising one or more layers, and a cover having one or more layers; and to a high-strength golf ball comprising a core having a main core and optionally a sub-core comprising one or more layers, an interlayer having one or more layers, and a cover having one or more layers; wherein at least one of the portions contains at least one member selected from the group consisting of carbon nanotubes and fullerenes.

1 Claim, 2 Drawing Sheets

HIGH-STRENGTH GOLF BALL

BACKGROUND OF THE INVENTION (1) Field of the Invention

The present invention relates to a high-strength golf ball.

(2) Description of the Related Art

Heretofore, golf balls comprising a butadiene rubber core and an ionomer resin cover have been the main type as two-piece solid golf balls. A golf ball having an ionomer resin cover exhibits a long carry or flight distance and great durability; however, the hitting impact feels hard, and because contact time of the ball with a club head is short, it tends to lower ball control.

Therefore, in recent years, to achieve a soft-feeling when hit and improve ball control, multi-piece solid golf balls wherein an interlayer of soft material is provided between the core and the cover, or wherein the cover is formed of a soft material, have also been used.

The properties required in golf balls include a soft-feeling on impact, controllability, and a long flight distance. When soft materials are used for each layer, the soft-feeling on impact can be obtained but the carry distance is reduced. In contrast, when hard materials are used, the flight distance increases but the hitting impact feels hard. Therefore, it is difficult to attain a golf ball that provides these incompatible properties in the same ball.

Furthermore, golf balls must have sufficient durability to withstand intense striking. For example, cracking that is generated in a ball when hit may instantaneously spread, splitting the ball. In particular, with an Iron, the surface of the cover of the ball may become nappy or scratched, or some dimples may be scraped off. To prevent the spread of cracking and/or damage to the surface, materials having a high tensile strength and elongation at break, or hard materials, may be used, but due to the increased elastic modulus, these balls have a hard-feeling on impact and/or a reduced carry distance.

BRIEF SUMMARY OF THE INVENTION

An object of the present invention is to provide a golf ball exhibiting a soft-feeling on impact, a long carry distance and excellent durability.

To achieve the object, the present inventors conducted extensive research and found (i) and (ii) described below.

(i) By including fibrous carbon nanotubes, such as carbon nanotube, carbon nanofiber or cup-stacked-type carbon nanotubes, in the core or an interlayer, in a multi-piece golf ball, the spread of cracking that is generated in the core or interlayer due to a striking impact stress can be prevented, i.e., the durability of the ball can be significantly improved. In spite of the improved durability of the ball, the elastic modulus of the core or interlayer does not increase or does not significantly increase. As a result, a ball having durability, a soft-feeling on impact and a long flight distance is obtained.

(ii) By including a material selected from carbon nanotubes, such as carbon nanotube, carbon nanofiber and cup-stacked-type carbon nanotubes, and fullerenes, such as fullerene and its derivatives, in the cover of a multi-piece golf ball, the spread of cracking that is generated in the cover due to a striking impact stress can be prevented and wear resistance can be significantly improved. In spite of the improved durability of the cover in a multi-piece golf ball, the elastic modulus does not increase or does not significantly increase. As a result, a golf ball having durability, including wear resistance, a soft-feeling on impact and a long carry distance is obtained.

The present invention has been accomplished based on intensive research on the above findings, and provides the following high-strength golf ball.

1. A high-strength golf ball comprising:
a core composed of a main core and, optionally, a sub-core having one or more layers; and
a cover having one or more layers;
wherein at least one part of the core and/or the cover contains at least one member selected from the group consisting of carbon nanotubes and fullerenes.

2. A high-strength golf ball according to item 1, wherein at least one part of the core contains at least one member selected from the group consisting of carbon nanotubes.

3. A high-strength golf ball according to item 2, wherein at least one part of the core contains a base rubber and at least one member selected from the group consisting of carbon nanotubes.

4. A high-strength golf ball according to item 2, wherein at least one layer of the cover contains at least one member selected from the group consisting of carbon nanotubes and fullerenes.

5. A high-strength golf ball according to item 4, wherein at least one layer of the cover contains a base material selected from the group consisting of resins and rubbers and at least one member selected from the group consisting of carbon nanotubes and fullerenes.

6. A high-strength golf ball according to item 1, wherein at least one layer of the cover contains at least one member selected from the group consisting of carbon nanotubes and fullerenes.

7. A high-strength golf ball according to item 6, wherein at least one layer of the cover contains a base material selected from the group consisting of resins and rubbers and at least one member selected from the group consisting of carbon nanotubes and fullerenes.

8. A high-strength golf ball comprising:
a core composed of a main core and, optionally, a sub-core having one or more layers;
an interlayer having one or more layers formed on the outer surface of the core; and
a cover having one or more layers formed on the outer surface of the interlayer;
wherein at least one part of the core, the interlayer, and/or the cover contains at least one member selected from the group consisting of carbon nanotubes and fullerenes.

9. A high-strength golf ball according to item 8, wherein at least one part of the core contains at least one member selected from the group consisting of carbon nanotubes.

10. A high-strength golf ball according to item 9, wherein at least one part of the core contains a base rubber and at least one member selected from the group consisting of carbon nanotubes.

11. A high-strength golf ball according to item 9, wherein at least one layer of the interlayer contains at least one member selected from the group consisting of carbon nanotubes.

12. A high-strength golf ball according to item 11, wherein at least one layer of the interlayer contains a base material selected from the group consisting of resins and rubbers and at least one member selected from the group consisting of carbon nanotubes.

13. A high-strength golf ball according to item 9, wherein at least one layer of the cover contains at least one member selected from the group consisting of carbon nanotubes and fullerenes.

14. A high-strength golf ball according to item 13, wherein at least one layer of the cover contains a base material selected from the group consisting of resins and rubbers and at least one member selected from the group consisting of carbon nanotubes and fullerenes.

15. A high-strength golf ball according to item 11, wherein at least one layer of the cover contains at least one member selected from the group consisting of carbon nanotubes and fullerenes.

16. A high-strength golf ball according to item 15, wherein at least one layer of the cover contains a base material selected from the group consisting of resins and rubbers and at least one member selected from the group consisting of carbon nanotubes and fullerenes.

17. A high-strength golf ball according to item 8, wherein at least one layer of the interlayer contains at least one member selected from the group consisting of carbon nanotubes.

18. A high-strength golf ball according to item 17, wherein at least one layer of the interlayer contains a base material selected from the group consisting of resins and rubbers and at least one member selected from the group consisting of carbon nanotubes.

19. A high-strength golf ball according to item 17, wherein at least one layer of the cover contains at least one member selected from the group consisting of carbon nanotubes and fullerenes.

20. A high-strength golf ball according to item 19, wherein at least one layer of the cover contains a base material selected from the group consisting of resins and rubbers and at least one member selected from the group consisting of carbon nanotubes and fullerenes.

21. A high-strength golf ball according to item 8, wherein at least one layer of the cover contains at least one member selected from the group consisting of carbon nanotubes and fullerenes.

22. A high-strength golf ball according to item 21, wherein at least one layer of the cover contains a base material selected from the group consisting of resins and rubbers and at least one member selected from the group consisting of carbon nanotubes and fullerenes.

The present invention provides a golf ball exhibiting the properties of a soft-feeling on impact, a long carry distance and excellent durability.

Furthermore, a golf ball of the present invention contains carbon nanotubes and/or fullerenes in at least one layer or part of the core, interlayer and cover. Carbon nanotubes are mixed in the core or interlayer.

Carbon nanotubes are extremely thin and exhibit a large L/D (aspect ratio). Therefore, it is assumed that the carbon nanotubes are intricately entangled in the matrix to which they are added. Furthermore, because of their fine tubular shape, carbon nanotubes have a very high Young's modulus and tensile strength, and therefore they do not break even when bent. Because of these properties, even if a crack is generated inside the ball, it will not spread and damage to the ball is effectively inhibited.

When a material having a high tensile strength, elongation at break and/or hardness is used to improve the durability of a ball, its elastic modulus is generally also increased. The greater the elastic modulus, the less the degree of deformation caused by external force. Therefore, when a material having a high tensile strength, elongation at break and/or hardness is used, the durability of the ball is generally improved; however, impact feel and flight distance tend to deteriorate.

In a golf ball of the present invention, very long carbon nanotubes having an extremely large aspect ratio are used, and such carbon nanotubes can flexibly deform in the matrix in which they are formulated against external forces, such as bending, bending load, compressive load, and impact load. Due to the properties of the formulated carbon nanotubes, a soft-feeling when hit, a long carry distance, and improved durability are achieved without increasing the elastic modulus of the matrix.

In the cover, instead of carbon nanotubes or in addition to carbon nanotubes, fullerenes may be used. Carbon nanotubes and fullerenes exhibit a self-lubricating ability and a sliding ability. Therefore, by including carbon nanotubes and/or fullerenes in the cover, the frictional resistance of the ball significantly decreases when it contacts the striking surface of a club head. As a result, the wear resistance of the ball against repeated strikes with a club head is significantly improved.

As described above, a golf ball having excellent wear resistance that can achieve a soft-feeling on impact and a long flight distance is obtained.

DETAILED DESCRIPTION OF THE INVENTION

Figure 1:
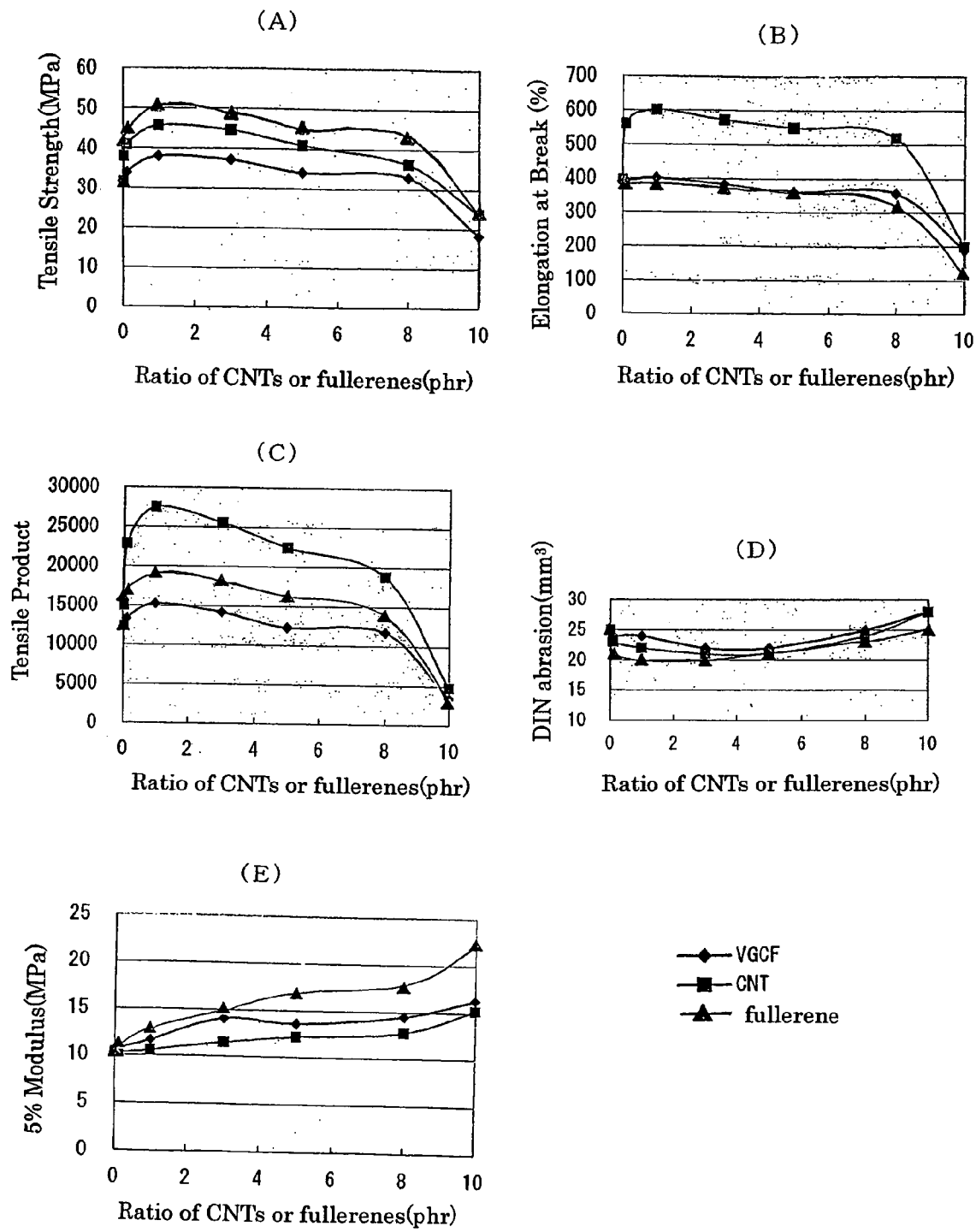
FIG. 1 is based on measurements of a specimen formed of an ionomer resin used for the cover of a golf ball of the present invention to which carbon nanotube, carbon nanofiber or fullerene has been added. The graph shows the relationship between the amounts added and the resulting properties.

Hereunder, the present invention is explained in detail.

(I) Layered Structure of the First Golf Ball

The first golf ball of the present invention comprises a core composed of a main core, or a main core and, further, a sub-core having one or more layers; and a cover having one or more layers; wherein at least one of the core and the cover contains at least one kind of carbon nanotubes and fullerenes. The core may be composed of only a main core, or a main core and at least one sub-core covering the main core.

Among carbon nanotubes and fullerenes, the material contained in the cover is one or more kinds of carbon nanotubes and the material contained in the cover is a member selected from the group consisting of carbon nanotubes and fullerenes. Details of the carbon nanotubes and fullerenes are explained later.

Specifically, golf balls having the layered structures as described in (1)–(3) below are exemplified.

In a golf ball comprising a core composed of a main core and, optionally, a sub-core having one or more layers, and a cover having one or more layers, (1) a high-strength golf ball wherein at least one part of the main core and the sub-core having one or more layers contains carbon nanotubes;

(2) a high-strength golf ball wherein at least one layer of the cover contains carbon nanotubes and/or fullerenes; and (3) a high-strength golf ball wherein at least one part of the main core and the sub-core having one or more layers contains carbon nanotubes, and at least one layer of the cover contains carbon nanotubes and/or fullerenes.

(II) Layered Structure of the Second Golf Ball

The second golf ball of the present invention comprises a core composed of a main core, or a main core and, further, a sub-core having one or more layers; an interlayer having one or more layers formed on the outer surface of the core; and a cover having one or more layers formed on the outer surface of the interlayer; wherein at least one part of the core, the interlayer and the cover contains at least one member selected from the group consisting of carbon nanotubes and fullerenes.

The core may be composed of only a main core, or a main core and at least one sub-core covering the main core.

Among carbon nanotubes and fullerenes, the core and the interlayer may include nanotubes and the cover may include a material selected from carbon nanotubes and fullerenes.

Specifically, golf balls having the layer structures as described in (4)–(10) below are exemplified.

In a golf ball comprising a core having a main core and, optionally, a sub-core comprising one or more layers; an interlayer having one or more layers formed on the outer surface of the core; and a cover having one or more layers formed on the outer surface of the interlayer, (4) a high-strength golf ball wherein at least one part of the main core and the sub-core having one or more layers contains carbon nanotubes;

(5) a high-strength golf ball wherein at least one layer of the interlayer contains carbon nanotubes;

(6) a high-strength golf ball wherein at least one layer of the cover contains carbon nanotubes and/or fullerenes;

(7) a high-strength golf ball wherein at least one part of the main core and the sub-core having one or more layers contains carbon nanotubes, and at least one layer of the interlayer contains carbon nanotubes;

(8) a high-strength golf ball wherein at least one part of the main core and the sub-core having one or more layers contains carbon nanotubes, and at least one layer of the cover contains carbon nanotubes and/or fullerenes;

(9) a high-strength golf ball wherein at least one layer of the interlayer contains carbon nanotubes, and at least one layer of the cover contains carbon nanotubes and/or fullerenes;

(10) a high-strength golf ball wherein at least one part of the main core and the sub-core having one or more layers contains carbon nanotubes, at least one layer of the cover contains carbon nanotubes and/or fullerenes, and at least one layer of the cover contains carbon nanotubes and/or fullerenes.

(III) Carbon Nanotubes and/or Fullerenes Carbon Nanotubes

The types of the carbon nanotubes are not limited and any known carbon nanotubes may be used without limitation. Examples of usable carbon nanotubes include carbon nanotube, carbon nanofiber, cup-stacked-type carbon nanotube, etc. (Hereunder, these are collectively called "CNTs".

Carbon nanotube has a tubular shape formed by rolling up a graphene sheet. The carbon nanotube may be a single-walled carbon nanotube formed from a single graphene sheet, or multi-walled carbon nanotube comprising a plurality of nested graphene sheets. It is also possible to use multi-walled carbon nanotube having an overall spiral form by scrolling a graphene sheet.

The number of layers of such multi-walled carbon nanotube is not limited as long as they can be manufactured; however, to improve the durability of a ball and obtains soft-feeling when hit, the fewer the layers the better. This is because, the fewer the layers, the softer and stronger the carbon nanotube should be. Therefore, to improve the properties of the obtained ball, single-walled carbon nanotube is more preferable, but multi-walled carbon nanotube is more preferable for low cost.

In the present invention, carbon nanotube is defined as CNTs having a diameter of not more than 70 nm. It is not necessary that carbon nanotube of the present invention has a uniform diameter, and the diameter may vary from one end to the other. The shape of the carbon nanotube is not particularly limited as long as it can be manufactured in such a manner that it has a diameter of not more than 70 nm. However, the diameter is preferably about 0.8–70 nm and more preferably about 10–20 nm. The L/D (length of the tube/diameter) is preferably about 10–10000. There is no particular upper limit to the length of such carbon nanotube as long as it can be produced; however, the maximum length thereof is usually about 10 μm.

When the diameter of the carbon nanotube is unduly large, the carbon nanotube becomes rigid and the modulus of elasticity of the obtained ball is unexpectedly high, resulting in a hard feel when hit. When the diameter of the carbon nanotube is unduly small, the processability thereof decreases, i.e., the dispersibility decreases and it becomes difficult to uniformly mix the carbon nanotube in a matrix. When the diameter of the carbon nanotube falls within the above ranges, satisfactorily soft-feeling when hit and excellent processability are obtained. When the length of the carbon nanotube is unduly short, the obtained reinforcement effect decreases; however, when it is unduly long, it becomes difficult to uniformly mix the carbon nanotube in a matrix. If the length of the carbon nanotube falls within the above range, it is possible to satisfactorily improve the durability of a ball and achieve excellent processability.

In the present invention, carbon nanofiber refers to CNTs having a diameter of more than 70 nm. The shapes of carbon nanofiber of the present invention include cone-like shapes having a diameter at one end different from that of the other end, corn shapes, and horn shapes. The shapes of the carbon nanofiber used in the present invention are not limited as long as they have a diameter of more than 70 nm and can be produced. However, the diameter is preferably about 100–200 nm and more preferably about 100–150 nm. The L/D is preferably not less than 60 and more preferably not less than 200 and not more than 1000. There is no upper limit to the length of such carbon nanofiber as long as it can be produced; however, carbon nanofiber generally has a length of about 100 μm or less.

When the diameter of the carbon nanofiber is unduly large, the carbon nanofiber becomes rigid, and therefore the elastic modulus of the obtained ball becomes too high, resulting in a hard feel when hit. When the diameter of the carbon nanofiber is unduly small, the matrix reinforcing effect decreases caused by an increase in the apparent volume of the fiber, decreasing the strength of the obtained ball. This also increases the mixing time and effort, because it becomes difficult to uniformly mix the carbon nanofiber in the matrix. If the diameter of the carbon nanofiber falls within the above ranges, a satisfactory soft-feeling when hit can be obtained, durability of the ball can be satisfactorily improved and excellent processability can be obtained. When the carbon nanofiber is too short, the strength of the obtained ball is reduced caused by a decrease in the matrix reinforcing effect. In contrast, when the length of the carbon nanofiber is too long, it is difficult to uniformly mix the carbon nanofiber in the matrix. If the length of the carbon nanofiber falls within the above range, it is possible to satisfactorily improve the durability of a ball and achieve excellent processability.

In the present invention, carbon nanofiber includes cup-stacked-type carbon nanotubes wherein many circular truncated cones having an open top and/or bottom are nested to form a tubular shape.

Cup-stacked-type carbon nanotubes having an outer diameter of about 80–100 nm, inner diameter of about 50–70 nm, and an L/D of about 10–5000 are preferably used. There is no upper limit to the length of the cup-stacked-type carbon nanotubes as long as they can be produced; however, those having a length of about 20–50 μm are preferably used.

When the length of the cup-stacked-type carbon nanotubes is unduly short, the reinforcing effect decreases and thereby the intensity of the obtained ball decreases; however, when it is unduly long, it becomes difficult to uniformly mix the cup-stacked-type carbon nanotubes in a matrix. If the length of the cup-stacked-type carbon nanotubes falls within the above range, it is possible to satisfactorily improve the durability of a ball and achieve excellent processability.

There is no limitation to the shapes of the CNTs used as long as they can be produced.

These CNTs can be produced by an arc-discharge method, laser ablation method, catalyst chemical vapor deposition (CVD), and like known methods. It is also possible to use commercially available carbon nanofibers such as "VGCF" and "VGCF-H" (product names, manufactured by Showa Denko K. K..), carbon nanotube such as "CNT 20" (product name, manufactured by Carbon Nanotech Research Institute Inc., hereunder called "CNRI"), cup-stacked-type carbon nanotubes such as "Carbere 24PS" (product name, manufactured by GSI Creos Corporation), etc.

Fullerenes

Fullerenes as used herein encompass both fullerene and fullerene derivatives. Fullerene refers to a molecule which has a closed polyhedral cage structure having 20 or more carbon atoms each bonded to three adjacent atoms. The shape of the fullerene is not limited as long as it can be produced. It is possible to use, for example, a single-layered hollow polyhedron or a plurality of nested polyhedrons. The fullerene may be a polyhedron that holds metal, silicon and other atoms or molecules therein. Generally, Fullerene Mixture (product name, containing $C_{60}$, $C_{70}$ and $C_{85}$ as its main components with the rest being higher fullerenes, manufactured by Frontier Carbon Corporation) is used.

Examples of known fullerene includes $C_{60}$, which is a typical example, $C_{70}$, $C_{74}$, $C_{76}$, $C_{78}$, $C_{80}$, $C_{82}$, $C_{84}$, $C_{85}$, etc. Examples of fullerene derivatives include hydrides, hydroxides, alkylates, halides and the like of such fullerene. Because Hydrogenated fullerene (manufactured by Frontier Carbon Corporation) is white, it is suitably formulated into a cover material.

(IV) Core Material

Rubber may be used as a base material for the core. In other words, it is possible to use a material for the core of multi-piece golf ball wherein CNTs are optionally added to known rubber compositions.

Both natural rubber and synthetic rubber may be used as a base rubber. Among these, it is preferable to use a high-cis polybutadiene rubber that contains 40% or more cis-1,4-bonds and preferably 80% or more. Natural rubber, polyisoprene rubber, styrene-butadiene rubber, ethylene-propylene-diene rubber (EPDM) and the like may be added to the high-cis polybutadiene rubber if necessary. Base rubbers may be used singly or in combination of two or more.

The rubber composition may additionally contain cross-linking agents, cocross-linking agents, fillers, antioxidants, peptizers, etc.

Known compounds used as cross-linking agents for rubbers may be used as the cross-linking agent. Examples of such cross-linking agents include dicumyl peroxide, t-butyl peroxide and like organic peroxides. Dicumyl peroxide is particularly preferable. The amount of cross-linking agent is not limited and may be suitably selected from a wide range. However, the preferable proportion of the cross-linking agent is, based on 100 parts by weight of base rubber, generally about 0.5 to 3 parts by weight and particularly about 0.7 to 2.2 parts by weight. If the proportion thereof falls within the above ranges, the resulting golf ball can attain a sufficient resilience, and accordingly achieve a sufficiently long carry distance as well as a sufficiently soft-feeling on impact.

There is no limitation to usable cocross-linking agents and various known compounds used as a cocross-linking agent for rubbers may be used. Examples of cocross-linking agents include metal salts of unsaturated carboxylic acids, such as univalent or divalent metal salts of unsaturated carboxylic acids having about 3 to 8 carbons, such as acrylic acid or methacrylic acid, etc. In order to achieve a high resilience, zinc salts of acrylic acids are preferable.

The amount of the cocross-linking agent added is not limited and may be suitably selected from a wide range. However, the preferable proportion of cocross-linking agent is, based on 100 parts by weight of base rubber, generally about 20 to 50 parts by weight, and particularly about 25 to 45 parts by weight. If the proportion thereof falls within the above ranges, the resulting golf ball can attain a sufficient resilience, and accordingly achieve a sufficiently long carry distance as well as a sufficiently soft-feeling on impact.

Various kinds of fillers used in this field may be used as the filler of the present invention. Examples of filler include zinc oxide, barium sulfate, calcium carbonate, tungsten powder, molybdenum powder, organic fillers, etc. The amount of filler added is not limited and may be suitably selected from a wide range. However, the preferable proportion of filler is, based on 100 parts by weight of base rubber, about 10 to 30 parts by weight. If the proportion thereof falls within the above ranges, the weight of the resulting golf ball should be appropriate.

The core optionally contains at least one kind of CNTs. The amount of CNTs added depends on the type of the CNT. However, the preferable proportion of CNTs is, based on 100 parts by weight of base rubber, generally about 0.01 to 8 parts by weight and particularly about 0.1 to 3 parts by weight. If the amount of CNTs added to the core is too small, a sufficient improvement in durability cannot be obtained. On the other hand, if the amount of CNTs added is too large, the core becomes too rigid, decreasing the impact resistance. When the amount of CNTs added falls within the above ranges, the durability of the resulting ball can be satisfactorily improved without making the obtained ball too rigid.

Because CNTs are extremely thin fibers having a large L/D, it is assumed that they are complicatedly entangled in the rubber composition and thereby function as an excellent reinforcement. It is possible that CNTs contribute cross-linking by being involved in a radical chain reaction. Furthermore, because CNTs have a fine tubular shape, they have a very high Young's modulus and tensile strength, and therefore they do not break when bent. For these reasons, when the core contains CNTs, cracking generated inside of the core does not spread, effectively preventing breakage of the ball. Because CNTs have an extremely large aspect ratio, even bending, bending load, compressive load, and impact load, etc., is applied to the core, it is assumed that CNTs can flexibly deform in the matrix. Therefore, the core is not hardened when CNTs are added thereto. This prevents cracking caused by impact stress when hit and achieves a soft-feeling on impact and a long flight distance.

The core can be produced by using the above-described rubber compositions for the core by employing a known method such as compression molding, etc.

It is preferable that the diameter of the core be about 29 to 39 mm and more preferably about 33 to 37 mm. If the core is provided with projections and/or ribs, the core diameter refers to the diameter of the spherical body excluding the projections and ribs. The hardness of the core is preferably about 60 to 80 on the JIS-C scale, and more preferably about 65 to 75.

The core may consist of a main core. Alternatively, the core may comprise a main core and one or more sub-core layers covering the main core. When a main core and a sub-core layer or layers are provided, it is merely necessary that they are composed of different components selected from the above mentioned rubber compositions. When CNTs are contained, it is merely necessary that at least one component composing the core contains CNTs.

(V) Interlayer

Resins and/or rubbers may be used as a base material for the interlayer. In other words, the interlayer may be formed from resin compositions mainly containing known ionomer resins, thermoplastic elastomers, etc., which are usable as materials for interlayers of multi-piece golf balls, or a mixture thereof, and, optionally, at least one member selected from CNTs and fullerenes. It is also possible to form the interlayer from rubber compositions. In particular, it is preferable to use synthetic resin composition (for example, ionomer, thermoplastic elastomer or mixture thereof) with at least one member selected from CNTs and fullerenes.

Examples of usable ionomer resins include copolymers of ethylene and α,β-unsaturated carboxylic acids wherein at least a portion of the carboxyl groups are neutralized with metal ions, and ternary copolymers of ethylene, α,β-unsaturated carboxylic acids and esters of α,β-unsaturated carboxylic acid wherein at least a portion of the carboxyl group are neutralized with metal ions, etc. Examples of α,β-unsaturated carboxylic acids include acrylic acid, methacrylic acid, fumaric acid, maleic acids, crotonic acid, etc. Examples of esters of α,β-unsaturated carboxylic acids include methyl, ethyl, propyl, n-butyl and isobutyl esters of acrylic acid, methacrylic acid, fumaric acid, maleic acid, etc. Examples of metal ions include ions of sodium, potassium, lithium, magnesium, calcium, zinc, barium, aluminum, tin, zirconium, cadmium, etc. Sodium, zinc and magnesium ions are particularly preferable with respect to high ball resilience, durability, etc.

Specific examples of usable ionomer resins include Himilan 1555, Himilan 1557, Himilan 1605, Himilan 1702, Himilan 1705, Himilan 1706, Himilan 1707, and Himilan 1855 (manufactured by Du Pont-Mitsui Polychemicals Co., Ltd.); Surlyn 8945, Surlyn 9945, Surlyn 6320, Surlyn 8320 and Surlyn 9320 (manufactured by Du Pont Co., Ltd.); Iotek 7010 and Iotek 8000 (manufactured by Exxon Mobil Chemical Co., Ltd.), etc.

Ionomer resins may be used singly or in combination of two or more. Among the above-exemplified ionomers, ethylene/(meth)acrylic acid copolymers neutralized with sodium ions, ethylene/(meth)acrylic acid copolymers neutralized with zinc ions, ethylene/(meth)acrylic acid/(meth)acrylic acid ester ternary copolymers neutralized with sodium ions, and ethylene/(meth)acrylic acid/(meth)acrylic acid ester ternary copolymers neutralized with zinc ions, etc. are preferable. Among these, mixtures of a polymer neutralized with sodium ion and a polymer neutralized with zinc ions are particularly preferable.

Various kinds of known thermoplastic elastomers including urethane-based, amide-based, polyester-based, styrene-based, olefin-based and like thermoplastic elastomers may be used. Specific examples of thermoplastic elastomers include PEBAX 2533 (product name, manufactured by Toray Industries, Inc.), which is a polyamide-based thermoplastic elastomer; Hytrel 3548 and Hytrel 4047 (product names, manufactured by Du Pont-Toray Co., Ltd.), which are polyester-based thermoplastic elastomers; Elastollan ET 880 (product name, manufactured by Takeda Badische Urethane Industries, Ltd.), which is polyurethane-based thermoplastic elastomer; and Pandex T-8180, Pandex T-7298, Pandex T-7895 and Pandex T-7890 (product names, manufactured by Dainippon Ink and Chemicals, Incorporated), etc. Urethane-based elastomers are preferably used as thermoplastic elastomers.

When the interlayer is composed of rubber compositions, the types of base rubber and other components are as described in the section describing the core. However, the preferable proportion of cross-linking agent is, based on 100 parts by weight of base rubber, generally about 0.1 to 3 parts by weight and particularly about 0.7 to 1 parts by weight; the preferable proportion of cocross-linking agent is about 15 to 35 parts by weight, and particularly 18 to 30 parts by weight; and the preferable proportion of filler is about 30 to 40 parts by weight. Butadiene rubber is preferably used as a base rubber: preferably a high-cis polybutadiene rubber that contains 40% or more cis-1,4-bonds and more preferably 80% or more is used.

The material for the interlayer may comprise fillers, pigments, antioxidants and like additives in addition to a base resin or base rubber.

The interlayer may optionally contain at least one kind of CNT. The preferable amount of CNTs added depends on the type thereof; however, it is preferably, based on 100 parts by weight of base material, about 0.1 to 8 parts by weight, and particularly preferably about 0.1 to 3 parts by weight. If the amount of CNTs added to the interlayer is unduly small, durability is insufficiently improved. If the amount of CNTs added is unduly large, the ball becomes very rigid, decreasing impact resistance. If the proportion of the CNTs falls within the above ranges, it is possible to satisfactorily improve the durability of a ball without making the ball too rigid. As a result, it is possible to obtain a satisfactory impact resistance, and the generation of cracks in the interlayer and an undesirable feel when hit is prevented.

When the interlayer contains CNTs, substantially the same effects as obtained by adding CNTs to the core can be achieved.

The interlayer may be formed by known methods such as injection molding, etc., when formed from a resin composition, and may be formed by known methods such as compression molding, etc., when formed from a rubber composition.

The thickness of the interlayer as a whole is preferably about 0.5 to 3 mm and more preferably about 1 to 2 mm. The hardness of the interlayer is preferably JIS-C hardness of about 70 to 90 and more preferably about 75 to 85.

The interlayer may be single-layered or multi-layered with two or more sub-layers. When the interlayer comprises two or more sub-layers, it is possible to form each sub-layer by selecting the materials from the above-mentioned resin compositions and rubber compositions in such a manner that each sub-layer has a different composition from each other. When the interlayer contains CNTs and is composed of two or more sub-layers, all that is necessary is at least one of the sub-layer contains CNTs.

(VI) Cover

Resin and/or rubber may be used as a base material for the cover. The cover may be formed from a composition containing, as a main component, ionomers, thermoplastic elastomers, diene-based block copolymers, balata rubber, etc., and mixtures thereof that are generally used as materials for covers of multi-piece golf balls, and optionally at least one member selected from CNTs and fullerenes.

The ionomers and thermoplastic elastomers are as described in the interlayer section. The diene-based block copolymers include block copolymers having double bonds of conjugated diene or their partially hydrogenated block copolymers, for example, block copolymers of an aromatic vinyl compound and conjugated diene compound or partially hydrogenated block copolymers thereof. Examples of aromatic vinyl compounds include styrene, α-methyl styrene, vinyltoluene, p-t-butylstyrene, 1,1-diphenylstyrene, etc. Examples of conjugated dienes compounds include butadiene, isoprene, 1,3-pentadiene, 2,3-dimethyl-1,3-butadiene, etc. Aromatic vinyl compounds and conjugate diene based compounds may be used singly or in combination of two or more.

Commercially available diene-based block copolymers such as the "Epofriend" series manufactured by Daicel Chemical Industries, Ltd., the "Septon" series manufactured by Kuraray Co., Ltd., etc., may be used.

It is preferable that ionomers, thermoplastic elastomers (in particular, urethane-based elastomers) or mixtures thereof be used as base material resins.

In addition to base material resins, the cover may contain fillers, pigments, antioxidants, ultraviolet absorbers, dispersants, plasticizers and like known additives.

The types of usable fillers are the same as in the section describing the core. The preferable proportion of the filler is, based on 100 parts by weight of base material, about 0 to 7 parts by weight. If the proportion thereof falls within this range, the weight of the obtained golf ball should be appropriate.

The cover optionally contains at least one type of carbon nanotubes and/or fullerenes selected from the group consisting of CNTs and fullerenes. When the cover contains CNTs, substantially the same effects obtained by adding CNTs to the core can be achieved. Because fullerenes have sliding ability, by adding fullerenes to the cover, the wear resistance of the cover can be significantly improved to withstand the wear caused by repeated impacts by a club head.

The amount of CNTs and fullerenes added varies depending on the kind; however, the preferable content of CNTs is, based on 100 parts by weight of base material, generally about 0.1 to 8 parts by weight and particularly about 0.1 to 3 parts by weight. The preferable content of fullerenes is, based on 100 parts by weight of base material, generally about 0.1 to 3 parts by weight. When the amounts of the CNTs and fullerenes added falls within the above ranges, it is possible to significantly improve the durability and obtain a soft-feeling on impact and impact resistance satisfactory for practical use.

There is no limitation to the thickness of the cover; however, it is preferably about 0.5 to 2 mm, and more preferably about 0.8 to 2 mm. The hardness of the cover is not limited; however, the Shore D hardness of the cover is preferably about 50 to 75, and more preferably about 50 to 60.

The cover is generally provided with dimples on the surface. There is no limitation to the geometric pattern of the dimples, octahedral, icosahedral and the like known patterns can be employed. The shape of the dimples is not limited and square, hexagonal, pentagonal, trianguler and like known shapes can be employed.

The cover can be produced by a known method such as injection molding.

The cover may be formed as a single layer or from two or more sub-layers. When the cover is composed of two or more sub-layers, it is merely necessary that different sub-layers be composed of different components selected form the above-mentioned resin composition. Containing fullerenes increases the elastic modulus, and therefore, within the range that the effect of improving wear resistance can be achieved, the smaller the amount of the fullerenes contained in the cover, the better. Therefore, when the ball is provided with two or more cover layers, fullerenes do not have to be added to the unexposed inner cover layer.

(VII) Specific Examples of Material Combination Base material

In a two-part golf ball comprising a single- or multi-layered core and a single- or multi-layered cover (in particular, a two-piece golf ball comprising a single-layered core and a single-layered cover), examples of combinations of base materials are as follows: base material for the core is a rubber (preferably butadiene rubber); base material for the cover is an ionomer or thermoplastic elastomer (preferably urethane-based elastomer) or a mixture thereof.

In a three-part golf ball comprising a single- or multi-layered core, a single- or multi-layered interlayer and a single- or multi-layered cover (in particular, a three-piece golf ball comprising a single-layered core, single-layered interlayer and single-layered cover), examples of combinations of base materials are as follows: a combination wherein the base material for the core is a rubber (preferably, butadiene rubber), the base material for the interlayer is a thermoplastic elastomer (preferably, urethane-based elastomer), and the base material for the cover is an ionomer; a combination wherein the base material for the core is rubber (preferably, butadiene rubber), base material for the interlayer is ionomer, and base material for the cover is a thermoplastic elastomer (preferably, urethane-based elastomer); a combination wherein the base material for the core and the base material for the interlayer is rubber (preferably, butadiene rubber), the base material for the cover is a mixture of an ionomer and a thermoplastic elastomer (preferably, urethane-based elastomer); a combination wherein the base material for the core and base material for the interlayer is rubber (preferably, butadiene rubber), and the base material for the cover is an ionomer; a combination wherein the base material for the core is a rubber (preferably, butadiene rubber), the base material for the interlayer is a mixture of an ionomer and a thermoplastic elastomer (preferably, urethane-based elastomer) and the base material for the cover is an ionomer; etc.

Carbon Nanotubes and/or Fullerenes

Table 1 shows preferable combinations of carbon nanotubes and/or fullerenes for use in two-part golf balls, in particular a two-piece golf ball. Table 1 exemplifies preferable combinations wherein each part contains one member selected from carbon nanotubes and fullerenes; however, it is possible to add two or more types of carbon nanotubes and/or fullerenes to each part.

TABLE 1

| Core | Cover |
|---|---|
| Carbon nanotube | — |
| Carbon nanofiber | — |
| Carbon nanotube | |
| | Carbon nanofiber |
| | Fullerene |
| Carbon nanofiber | Carbon nanotube |
| | Carbon nanofiber |
| | Fullerene |
| — | Carbon nanotube |
| | Carbon nanofiber |
| | Fullerene |

In a three-part golf ball (in particular, three-piece golf ball) the combinations shown in Table 2 are exemplified. Table 2 exemplifies preferable combinations wherein each part contains one member selected from carbon nanotubes and fullerenes; however, it is possible to add two or more types of carbon nanotubes and/or fullerenes to each part.

TABLE 2

| Core | Interlayer | Cover |
|---|---|---|
| Carbon nanotube | — | — |
| Carbon nanofiber | — | — |
| — | Carbon nanotube | — |
| | Carbon nanofiber | |
| Carbon nanotube | — | Carbon nanotube |
| | Carbon nanotube | |
| | Carbon nanofiber | |
| Carbon nanotube | — | Carbon nanofiber |
| | Carbon nanotube | |
| | Carbon nanofiber | |
| Carbon nanotube | — | Fullerene |
| | Carbon nanotube | |
| | Carbon nanofiber | |
| Carbon nanofiber | — | Carbon nanotube |
| | Carbon nanotube | |
| | Carbon nanofiber | |
| Carbon nanofiber | — | Carbon nanofiber |
| | Carbon nanotube | |
| | Carbon nanofiber | |
| Carbon nanofiber | — | Fullerene |
| | Carbon nanotube | |
| | Carbon nanofiber | |
| — | — | Carbon nanotube |
| | Carbon nanotube | |
| | Carbon nanofiber | |
| — | — | Carbon nanofiber |
| | Carbon nanotube | |
| | Carbon nanofiber | |
| — | — | Fullerene |
| | Carbon nanotube | |
| | Carbon nanofiber | |

EXAMPLES

The present invention is explained in detail below with reference to Examples and Test Examples; however, the present invention is not limited to these.

<Examination of the Effect of Addition of Carbon Nanotubes and/or Fullerenes to the Materials of each Layer>

VGCF-H (product name, diameter of 150 nm and fiber length of 30–40 μm), which is a vapor-grown carbon fiber (VGCF) manufactured by Showa Denko K. K., was used as a carbon nanofiber. CN-20 (product name, diameter of 20 nm and a length of 0.25 μm), which is a multi-walled carbon nanotube manufactured by Carbon Nanotech Research Institute (CNRI), was used as a carbon nanotube. A mixed fullerene (containing 60% $C_{60}$ and 25% $C_{70}$), manufactured by Frontier Carbon Corporation was used.

Cover

Specimens each having a size of 150 mm×150 mm×thickness of 2 mm were prepared by adding from 0.005 to 10 parts by weight of one of the above-mentioned VGCF, CNT and fullerene to 100 parts by weight of cover ionomer resin containing 50 wt. % each of Himilan 1605 and Himilan 1706 (product names, both manufactured by Du Pont-Mitsui Polychemicals Co., Ltd.). Control specimens were prepared in the same manner without adding these carbon nanotubes and/or fullerenes.

The tensile strength (JIS K7311), elongation at break (JIS K7311), 5% modulus (JIS K7113) and DIN abrasion (JIS K6264) of these specimen were tested. The tensile strength and elongation at break were measured while extending the specimen at a speed of 500 mm/min.

FIG. 1 shows the relationship between the amounts of carbon nanotubes and/or fullerenes added and the measured values. FIG. 1 (A) shows tensile strength, (B) shows elongation at break, (C) shows tensile product (the product of tensile strength and elongation at break), (D) shows DIN abrasion amount, and (E) shows 5% modulus. Tables 3 to 5 show the relationship between the amount of the carbon nanotubes and/or fullerenes added and tensile strength, elongation at break, tensile product, DIN abrasion amount, and 5% modulus.

TABLE 3

Carbon nanofiber (VGCF)

| Amount added (phr) | Hardness (D) | Strength (MPa) | Elongation at break (%) | Tensile product | 5% modulus (MPa) | DIN abrasion (mm³) |
|---|---|---|---|---|---|---|
| 0 | 61 | 31.5 | 390 | 12285 | 10.3 | 25 |
| 0.005 | 61 | 31.6 | 388 | 12255 | 10.3 | 25 |
| 0.1 | 61 | 33.9 | 392 | 13302 | 10.8 | 24 |
| 1 | 62 | 38.1 | 401 | 15258 | 11.7 | 24 |
| 3 | 62 | 37.1 | 382 | 14199 | 14.1 | 22 |
| 5 | 63 | 34.0 | 360 | 12250 | 13.6 | 22 |
| 8 | 63 | 32.9 | 358 | 11765 | 14.5 | 25 |
| 10 | 64 | 18.4 | 190 | 3496 | 16.3 | 28 |

TABLE 4

Carbon nanotube

| Amount added (phr) | Hardness (D) | Strength (MPa) | Elongation at break (%) | Tensile product | 5% modulus (MPa) | DIN abrasion (mm³) |
|---|---|---|---|---|---|---|
| 0 | 61 | 31.5 | 390 | 12285 | 10.3 | 25 |
| 0.005 | 61 | 37.9 | 395 | 14976 | 10.3 | 25 |
| 0.1 | 61 | 40.8 | 560 | 22861 | 10.3 | 23 |
| 1 | 61 | 45.7 | 601 | 27506 | 10.6 | 22 |
| 3 | 62 | 44.6 | 573 | 25545 | 11.5 | 21 |
| 5 | 62 | 40.8 | 550 | 22453 | 12.2 | 21 |
| 8 | 62 | 36.3 | 520 | 18876 | 12.8 | 24 |
| 10 | 63 | 23.9 | 200 | 4780 | 15.2 | 28 |

TABLE 5

Fullerene

| Amount added (phr) | Hardness (D) | Strength (MPa) | Elongation at break (%) | Tensile product | 5% modulus (MPa) | DIN abrasion (mm$^3$) |
|---|---|---|---|---|---|---|
| 0 | 61 | 31.5 | 390 | 12285 | 10.3 | 25 |
| 0.005 | 61 | 41.7 | 388 | 16181 | 10.5 | 25 |
| 0.1 | 62 | 44.9 | 380 | 17064 | 11.2 | 21 |
| 1 | 63 | 50.3 | 380 | 19118 | 12.9 | 20 |
| 3 | 63 | 49.1 | 370 | 18154 | 15.0 | 20 |
| 5 | 64 | 44.9 | 360 | 16166 | 16.8 | 21 |
| 8 | 65 | 43.2 | 320 | 13838 | 17.7 | 23 |
| 10 | 66 | 24.2 | 120 | 2904 | 22.3 | 25 |

As is clear from FIG. 1 and Tables 3 to 5, when 0.01–8 parts by weight of carbon nanofiber, carbon nanotube or fullerene is added to an ionomer, compared to the ionomer with no carbon nanofiber, carbon nanotube or fullerene, the tensile product is further increased and the abrasion volume is decreased.

With regard to the effect that addition of carbon nanofiber, carbon nanotube or fullerene gives to 5% modulus, a significant increase in 5% modulus was not observed regardless of the kinds of carbon nanotubes and/or fullerenes used, as long as the amount added was not more than about 8 parts by weight.

It is clear that the amount of carbon nanotubes and/or fullerenes added that most effectively increases tensile product and decreases abrasion volume, while preventing increasing the elastic modulus is, based on 100 parts by weight of base resin material, about 0.1 to 8 parts by weight in the case of carbon nanotube, about 0.1 to 8 parts by weight in the case of carbon nanofiber, and about 0.1 to 3 parts by weight in the case of fullerene.

Core

Specimens each having the size of 150 mm×150 mm×thickness of 2 mm were prepared by adding 0.005 to 10 parts by weight each of the carbon nanofiber and carbon nanotube to 100 parts by weight of BR-11 (product name, manufactured by Japan synthetic rubber (JSR)).

The tensile strength (JIS K6251), elongation at break (JIS K6251) and 10% modulus of these specimens were tested. The tensile strength and elongation at break were measured while extending the specimen at a speed of 500 mm/min.

Figure 2:
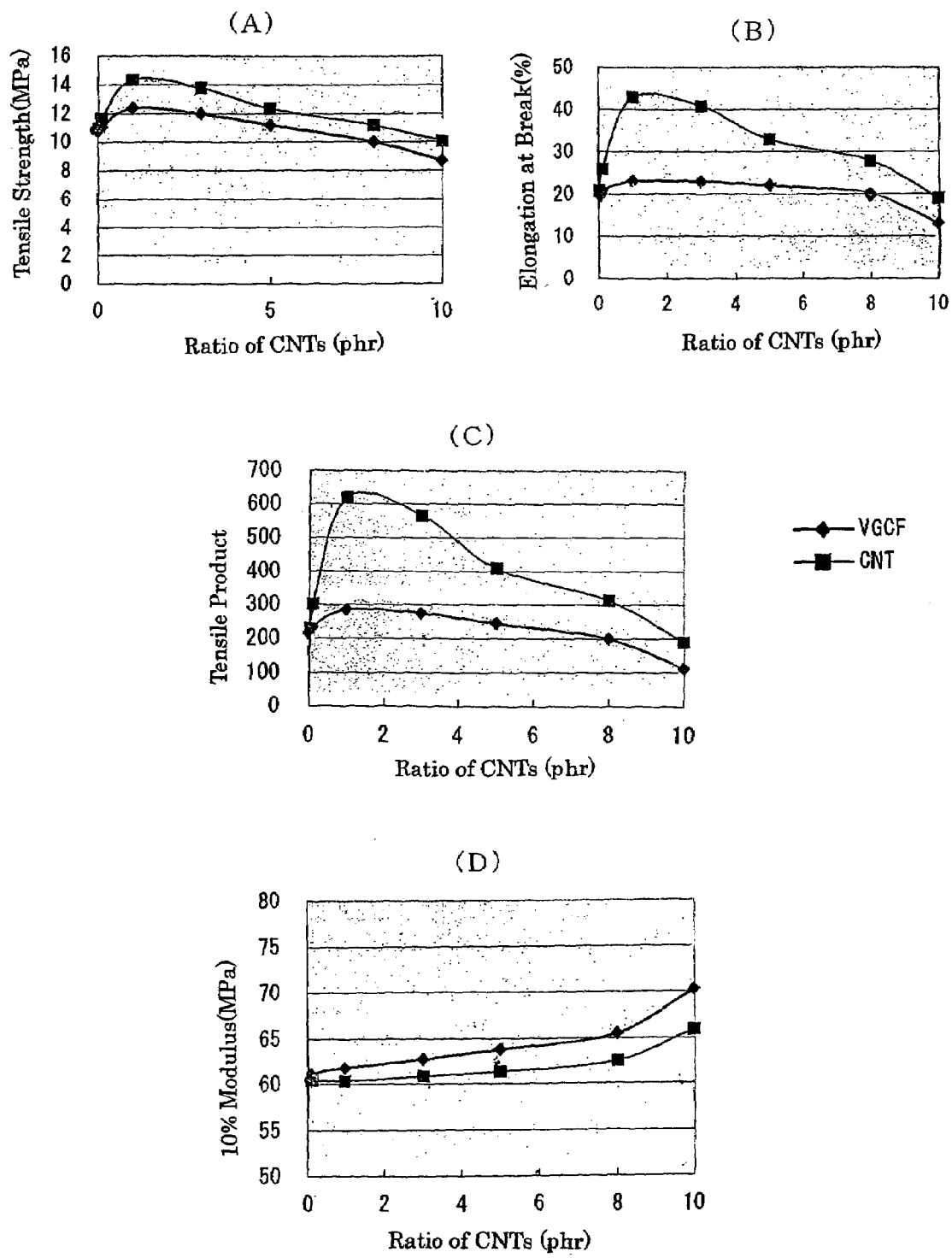
FIG. 2 is based on measurements of specimen formed of rubber used for the core of a golf ball of the present invention to which carbon nanotube or carbon nanofiber core has been added. The graph shows the relationship between the amounts added and the resulting properties.

The relationships between the amount of CNTs added and the obtained values are shown in FIG. 2. FIG. 2(A) shows tensile strength, (B) shows elongation at break, (C) shows tensile product (product of tensile strength and elongation at break), and (D) shows 10% modulus. Table 6 and Table 7 show the relationship between the amount of CNTs added and tensile strength, elongation at break, tensile product and 10% modulus.

TABLE 6

Carbon nanofiber

| Amount added (phr) | Hardness (A) | Strength (MPa) | Elongation at break (%) | Tensile product | 10% modulus (MPa) |
|---|---|---|---|---|---|
| 0 | 93 | 10.9 | 20 | 218 | 69.9 |
| 0.005 phr | 93 | 10.8 | 20 | 216 | 69.9 |
| 0.1 phr | 93 | 11.1 | 21 | 233 | 71.0 |
| 1 phr | 93 | 12.4 | 23 | 285 | 71.7 |
| 3 phr | 94 | 12.0 | 23 | 276 | 72.7 |
| 5 phr | 94 | 11.2 | 22 | 246 | 74.0 |
| 8 phr | 95 | 10.0 | 20 | 200 | 76.0 |
| 10 phr | 95 | 8.7 | 13 | 113 | 81.4 |

TABLE 7

Carbon nanotube

| Amount added (phr) | Hardness (A) | Strength (MPa) | Elongation at break (%) | Tensile product | 10% modulus (MPa) |
|---|---|---|---|---|---|
| 0 | 93 | 10.9 | 20 | 218 | 69.9 |
| 0.005 | 93 | 11.0 | 21 | 231 | 69.9 |
| 0.1 | 93 | 11.7 | 26 | 304 | 70.2 |
| 1 | 93 | 14.4 | 43 | 619 | 70.1 |
| 3 | 94 | 13.8 | 41 | 566 | 70.6 |
| 5 | 94 | 12.4 | 33 | 409 | 71.2 |
| 8 | 95 | 11.2 | 28 | 314 | 72.5 |
| 10 | 95 | 10.1 | 19 | 192 | 76.4 |

As is clear from FIG. 2, Table 6 and Table 7, the tensile product is significantly increased by adding a certain amount of carbon nanotube to butadiene. With regard to the effect that addition of CNTs gives to 10% modulus, significant increase in 10% modulus is not observed, as long as the amount added is no more than about 8 parts by weight.

The amount of CNTs added that effectively increases tensile product and impact resistance while preventing increasing the elastic modulus is, based on 100 parts by weight of base resin material, about 0.1 to 8 parts by weight in the case of carbon nanotube, and about 0.1 to 3 parts by weight in the case of carbon nanofiber.

<Examples of Methods for Manufacturing Balls>

In the examples for manufacturing a ball explained below, CNT-20 (product name, diameter of 20 nm, length of 0.25 μm, multi-walled) manufactured by Carbon Nanotech Research Institute (CNRI) was used as a carbon nanotube.

VGCF-H (product name, diameter of 150 nm and length of 30–40 μm) manufactured by Showa Denko K. K. was used as a carbon nanofiber.

Carbere TEM (product name, outer diameter of 100 nm, inner diameter of 70 nm, length of 20–50 μm) manufactured by GSI Creos Corporation was used as a cup-stacked-type carbon nanotubes. Fullerene mixture (containing 60% of $C_{60}$ and 25% of $C_{70}$) manufactured by Frontier Carbon Corporation was used as fullerene.

Cases in Which Carbon Nanotubes and/or Fullerenes are Added to the Core (Rubber Composition) of a Two-piece Golf Ball Examples 1-1 to 1-10

A core having a diameter of 39.1 mm was produced by compression molding using a rubber composition comprising butadiene rubber BR-11 (manufactured by JSR Corporation), one or two kinds of the above-mentioned carbon nanotube, carbon nanofiber and cup-stacked-type carbon nanotubes as carbon nanotubes and/or fullerenes, zinc oxide, barium sulfate, dicumyl peroxide, zinc acrylate and 2,2'-methylenebis-4-methyl-6-t-butylphenol as an anti-oxidant.

A cover having a thickness of 1.8 mm was formed by injection molding over the core using an ionomer reign (containing 50 wt. % each of Himilan 1605 and Himilan 1706 (product names, both manufactured by Du Pont-Mitsui Polychemicals Co., Ltd.).

Comparative Example 1-1

Two-piece golf balls were produced in the same manner as in Example 1-1 except that carbon nanotubes and/or fullerenes were not added to the core.

Comparative Examples 1-2 to 1-4

Two-piece golf balls were produced in the same manner as in Examples 1-1 to 1-10 except that the amount of carbon nanotubes and/or fullerenes added to the core was 10 parts by weight based on 100 parts by weight of butadiene rubber.

Comparative Examples 1-5 and 1-6

Two-piece golf balls were produced in the same manner as in Examples 1-1 to 1-10 except that the carbon nanotubes and/or fullerenes added to the core was fullerene.

Cases in Which Carbon Nanotubes and/or Fullerenes are Added to the Core and Interlayer (Rubber Composition) of a Three-Piece Golf Ball

Examples 2-1 to 2-6

A core having a diameter of 36.3 mm was produced by compression molding using a rubber composition containing 100 parts by weight of butadiene rubber BR-11 (manufactured by JSR Corporation), 5 parts by weight of zinc oxide, 11 parts by weight of barium sulfate, 1 part by weight of dicumyl peroxide, 26 parts by weight of zinc acrylate, 0.1 part by weight of 2,2'-methylenebis-4-methyl-6-t-butylphenol serving as an anti-oxidant, and optionally 1 part by weight of the above-explained CNT or carbon nanofiber (hereunder, termed CNF).

An interlayer having a thickness of 1.5 mm was formed over the core by compression molding using a rubber composition containing 100 parts by weight of butadiene rubber BR-11 (product name, manufactured by JSR Corporation), 5 parts by weight of zinc oxide, 34 parts by weight of barium sulfate, 1 part by weight of dicumyl peroxide, 21 parts by weight of zinc acrylate, 2,2'-methylene bis-4-methyl-6-t-butylphenol as an anti-oxidant, and optionally 1 part by weight of the above-mentioned CNT or CNF.

A cover having a thickness of 1.7 mm was formed over the interlayer by injection molding using an ionomer resin containing 50 wt. % each of Himilan 1605 and Himilan 1706 (product names, both manufactured by Du Pont-Mitsui Polychemicals Co., Ltd.)

Comparative Example 2-1

Two-piece golf balls were produced in the same manner as in Example 2-1 except that both the core and the interlayer did not contain carbon nanotubes nor fullerenes.

Comparative Example 2-2

Three-piece golf balls were manufactured in the same manner as in Example 2-1, except that Surlyn AD8269 (manufactured by Du Pont Co., Ltd.), which is an ionomer resin, was used as a material for the interlayer, and Elastollan 1154D (manufactured by BASF), which is a polyurethane resin, was used as the cover, and no carbon nanotubes and/or fullerenes were used.

Comparative Example 2-3

Three-piece golf balls were manufactured in the same manner as in Example 2-1, except that fullerene was added to the core and the interlayer as carbon nanotubes and/or fullerenes.

Cases in Which Carbon Nanotubes and/or Fullerenes are Added to the Interlayer and Cover (Ionomer Resin) of Three-Piece Golf Balls A core having a diameter of 36.3 mm was produced by compression molding using the various rubber compositions as described below.

An interlayer having a thickness of 1.5 mm was then formed over the core using a composition comprising a rubber composition, Surlyn AD8269 (manufactured by Du Pont Co., Ltd., an ionomer resin), or Elastollan ET890 (manufactured by BASF, a polyurethane resin), and optionally the previously-described carbon nanotube or carbon nanofiber. The rubber composition was formed by compression molding and a resin composition was formed by injection molding.

A cover having a thickness of 1.7 mm was formed on the interlayer by injection molding using a resin composition comprising Himilan 1706 and Himilan 1605 (both manufactured by Du Pont-Mitsui Polychemicals Co., Ltd.), which are ionomer resins, in a weight ratio of 1:1, or Elastollan 1154D (manufactured by BASF), which is a polyurethane resin, and optionally the above-described carbon nanotube, carbon nanofiber or fullerene.

Comparative Example 3-1

Three-piece golf balls were manufactured in the same manner as in Example 3-1 except that neither the core nor the interlayer contains carbon nanotubes and/or fullerenes.

Comparative Example 3-2

Three-piece golf balls were manufactured in the same manner as in Example 3-1, except that Surlyn AD8269 (manufactured by Du Pont Co., Ltd.), which is an ionomer resin, was used as a material for the interlayer, Elastollan 1154D (manufactured by BASF), which is polyurethane resin, was used as the cover, and no carbon nanotubes and/or fullerenes were used.

Comparative Example 3-3

Three-piece golf balls were manufactured in the same manner as in Example 3-3, except that 10 parts by weight of CNT based on 100 parts by weight of base ionomer resin material was added to the cover.

Comparative Example 3-4

Three-piece golf balls were manufactured in the same manner as in Example 3-1, except that 0.05 parts by weight of the CNT based on 100 parts by weight of base ionomer resin material was added to the cover.

Test for Carry Distance and Speed of Backspin

Using the golf balls obtained in the Examples and Comparative Examples described above, hitting tests were conducted using a hitting robot (manufactured by Miyamae Co., Ltd.: product name "SHOT ROBO V") with a number one Wood (1W: Mizuno Corporation; Mizuno 300S-II 380, loft angle: 9°, shaft length: 44.75 inches (113.66 cm), shaft hardness: S) by hitting the balls one by one at a head speed of 43 m/sec, then carry distance (distance the ball travels before reaching the ground) and the backspin speed were measured. The backspin speed was obtained by taking photographs of the ball immediately after hit with a high speed camera and by processing the image. The tests for carry distance and speed of backspin were performed for 5 balls on each example to obtain average values.

<Feel Test>

Ten top amateurs golfers were allowed to hit the balls obtained in Examples 1 to 3 and Comparative Examples 1 to 6 using a 1W and a 5I. Feel when hit was evaluated at three grades (○: 2 points, Δ:1 point, and X:0 point) by the ten golfers and an average value was calculated.

<Durability Test>

The balls obtained in each Example and Comparative Example were fired from an air gun and repeatedly allowed to impact at a speed of 40 m/sec against an iron struck plate 2.5 m from the forward end of the gun to determine the number of strikes until cracks on the surface of the ball and/or a deformation due to layer separation could be observed. The average number of strikes was calculated in each Example and Comparative Example until cracks on the surface of the ball and/or a deformation due to layer separation could be observed to three balls in each Example and Comparative Example. In Examples 1-1 to 1-10 and Comparative Examples 1-1 to 1-6, the durability is shown as a ratio to the average hit number of Example 1-1 being defined as 100; in Examples 2-1 to 2-6 and Comparative Examples 2-1 to 2-3, it is shown as a ratio to the average struck number of Example 2-1 being defined as 100, and in Examples 3-1 to 3-9 and Comparative Examples 3-1 to 3-4, it is shown as a ratio to the average struck number of Example 3-1 being defined as 100.

<Two-Piece Golf Ball>

The compositions of the cores of the balls of Examples 1-1 to 1-10 and Comparative Examples 1-1 to 1-6 are shown in Table 8. In this table, tube stands for carbon nanotube, fiber stands for carbon nanofiber, and cup stands for cup-stacked-type carbon nanotubes. The unit of the numbers in the table is parts by weight (phr).

TABLE 8

| | Carbon nanotubes and/or fullerenes | | Butadiene rubber (phr) | Zinc oxide (phr) | Barium sulfate (phr) | Dicumyl peroxide (phr) | Zinc Acrylate (phr) | Antioxidant Note 1) (phr) |
|---|---|---|---|---|---|---|---|---|
| | Type | Amount added (phr) | | | | | | |
| Ex. 1-1 | Tube | 0.2 | 100 | 5 | 16 | 1 | 26 | 0.1 |
| Ex. 1-2 | Tube | 1 | 100 | 5 | 16 | 1 | 26 | 0.1 |
| Ex. 1-3 | Tube | 8 | 100 | 5 | 12 | 1 | 26 | 0.1 |
| Ex. 1-4 | Fiber | 0.2 | 100 | 5 | 16 | 1 | 26 | 0.1 |
| Ex. 1-5 | Fiber | 1 | 100 | 5 | 16 | 1 | 26 | 0.1 |
| Ex. 1-6 | Fiber | 8 | 100 | 5 | 12 | 1 | 26 | 0.1 |
| Ex. 1-7 | Tube and Fiber | 0.5 + 0.5 | 100 | 5 | 16 | 1 | 26 | 0.1 |
| Ex. 1-8 | Cup | 0.2 | 100 | 5 | 16 | 1 | 26 | 0.1 |
| Ex. 1-9 | Cup | 1 | 100 | 5 | 16 | 1 | 26 | 0.1 |
| Ex. 1-10 | Cup | 8 | 100 | 5 | 12 | 1 | 26 | 0.1 |
| Comp. Ex. 1-1 | — | 0 | 100 | 5 | 16 | 1 | 26 | 0.1 |
| Comp. Ex. 1-2 | Tube | 10 | 100 | 5 | 10 | 1 | 26 | 0.1 |
| Comp. Ex. 1-3 | Fiber | 10 | 100 | 5 | 10 | 1 | 26 | 0.1 |
| Comp. Ex. 1-4 | Cup | 10 | 100 | 5 | 10 | 1 | 26 | 0.1 |
| Comp. Ex. 1-5 | Fullerene | 1 | 100 | 5 | 16 | 1 | 26 | 0.1 |

TABLE 8-continued

| | Carbon nanotubes and/or fullerenes | | Butadiene rubber (phr) | Zinc oxide (phr) | Barium sulfate (phr) | Dicumyl peroxide (phr) | Zinc Acrylate (phr) | Anti-oxidant Note 1) (phr) |
|---|---|---|---|---|---|---|---|---|
| | Type | Amount added (phr) | | | | | | |
| Comp. Ex. 1-6 | Fullerene | 8 | 100 | 5 | 12 | 1 | 26 | 0.1 |

(Note 1)
2,2'-methylenebis-4-methyl-6-t-butylphenol was used as the anti-oxidant Table 9 shows the layered structure of the balls obtained in Examples 1-1 to 1-10 and Comparative Examples 1-1 to 1-6, their durability, carry distances, and feel when hit. In each example, the base material for the core is butadiene rubber and that for a cover is an ionomer (Himilan 1605+ Himilan 1706).

TABLE 9

| | Carbon nanotubes and/or fullerenes | | Core weight (g) | Ball weight (g) | Durability | Carry distance (m) | Feel |
|---|---|---|---|---|---|---|---|
| | Types | Amount added (phr) | | | | | |
| Ex. 1-1 | Tube | 0.2 | 36.27 | 45.37 | 100 | 200.3 | 1.9 |
| Ex. 1-2 | Tube | 1 | 36.34 | 45.43 | 104 | 201.1 | 1.9 |
| Ex. 1-3 | Tube | 8 | 36.38 | 45.46 | 102 | 202.3 | 1.8 |
| Ex. 1-4 | Fiber | 0.2 | 36.28 | 45.37 | 98 | 198.1 | 1.8 |
| Ex. 1-5 | Fiber | 1 | 36.35 | 45.44 | 100 | 200.0 | 1.8 |
| Ex. 1-6 | Fiber | 8 | 36.40 | 45.48 | 99 | 199.9 | 1.7 |
| Ex. 1-7 | Tube and Fiber | 0.5 + 0.5 | 36.27 | 45.36 | 109 | 200.5 | 1.8 |
| Ex. 1-8 | Cup | 0.2 | 36.29 | 45.38 | 99 | 199.4 | 1.8 |
| Ex. 1-9 | Cup | 1 | 36.35 | 45.45 | 102 | 200.3 | 1.8 |
| Ex. 1-10 | Cup | 8 | 36.41 | 45.50 | 100 | 201.3 | 1.7 |
| Comp. Ex. 1-1 | — | 0 | 36.25 | 45.34 | 82 | 198.0 | 1.8 |
| Comp. Ex. 1-2 | Tube | 10 | 36.22 | 45.32 | 96 | 204.8 | 0.9 |
| Comp. Ex. 1-3 | Fiber | 10 | 36.25 | 45.34 | 92 | 200.5 | 0.5 |
| Comp. Ex. 1-4 | Cup | 10 | 36.24 | 45.33 | 91 | 200.6 | 0.6 |
| Comp. Ex. 1-5 | Fullerene | 1 | 36.32 | 45.40 | 97 | 200.1 | 0.8 |
| Comp. Ex. 1-6 | Fullerene | 8 | 36.33 | 45.42 | 89 | 201.6 | 0.4 |

As is clear from Table 9, by adding CNT, CNF and/or cup-stacked-type carbon nanotubes, singly or in combination, to a core of a two-piece golf ball that is made from a rubber composition in such a manner that the added amount is not more than 8 parts by weight based on 100 parts by weight of base rubber (Examples 1-1 to 1-10), the durability of the ball is significantly improved compared to balls without such materials (Comparative Example 1-1). It is also clear that compared to balls without such materials (Comparative Example 1-1), balls having cores with such materials exhibited the same or longer carry distances and substantially the same excellent impact feeling.

In contrast, when the core contains CNT, CNF or cup-stacked-type carbon nanotubes in a relatively large amount, such as 10 parts by weight, based on 100 parts by weight of base rubber (Comparative Examples 1-2 to 1-4), the obtained balls exhibited superior durability and carry distance to those without such materials (Comparative Example 1-1); however, the impact when hit felt harder.

When fullerenes are added to the core (Comparative Examples 1-5 and 1-6), the durability and carry distance are greater than balls without such a material (Comparative Example 1-1); however, the impact when hit felt harder.

When carbon nanotubes are added to the core in a suitable amount (not more than 8 parts by weight based on 100 parts by weight of base rubber) (Examples 1-1 to 1-10), the durability of the balls is better than cases wherein the core contains fullerenes (Comparative Examples 1-5 and 1-6).

<Three-Piece Golf Ball>

Table 10 shows the layered structure, durability, carry distance and impact feeling of the three-piece golf balls obtained in Examples 2-1 to 2-6 and Comparative Examples 2-1 to 2-3 wherein carbon nanotubes and/or fullerenes were added to the core and/or the interlayer of the balls.

Base Material

Examples 2-1 to 2-6, and Comparative Examples 2-1 and 2-3

Core: Butadiene rubber
Interlayer: Butadiene rubber
Cover: Ionomer (Himilan 1605+Himilan 1706)

Comparative Example 2-2

Core: Butadiene rubber
Interlayer: Ionomer (Surlyn AD8269)
Cover: Polyurethane resin (Elastollan 1154D)

In the Examples and Comparative Examples, the amount of the carbon nanotubes and/or fullerenes added is 1 part by weight (phr) based on 100 parts by weight (phr) of base rubber or base resin.

TABLE 10

| | Carbon nanotubes and/or fullerenes | | Core weight (g) | Inter-layer weight (g) | Ball weight (g) | Durability | Carry distance (m) | Feel |
|---|---|---|---|---|---|---|---|---|
| | Core | Inter-layer | | | | | | |
| Ex. 2-1 | Tube | Tube | 28.31 | 36.74 | 45.37 | 100 | 203.1 | 1.9 |
| Ex. 2-2 | Tube | — | 28.31 | 36.73 | 45.35 | 92 | 202.0 | 1.9 |
| Ex. 2-3 | — | Tube | 28.30 | 36.73 | 45.35 | 98 | 200.9 | 1.9 |
| Ex. 2-4 | Fiber | Fiber | 28.32 | 36.76 | 45.38 | 97 | 202.4 | 1.6 |
| Ex. 2-5 | Fiber | — | 28.32 | 36.73 | 45.35 | 90 | 199.6 | 1.7 |
| Ex. 2-6 | — | Fiber | 28.29 | 36.72 | 45.35 | 96 | 198.8 | 1.7 |
| Comp. Ex. 2-1 | — | — | 28.30 | 36.72 | 45.34 | 80 | 191.6 | 1.9 |
| Comp. Ex. 2-2 | — | — | 28.31 | 34.78 | 45.38 | 76 | 188.0 | 1.9 |
| Comp. Ex. 2-3 | Fullerene | Fullerene | 28.31 | 36.74 | 45.36 | 99 | 202.5 | 1.2 |

As is clear from Table 10, by adding carbon nanotube or carbon nanofiber to the core and/or interlayer of a three-piece golf ball formed from a rubber composition (Examples 2-1 to 2-6), the durability and carry distance of a ball are significantly improved compared to the balls wherein carbon nanotube or carbon nanofiber is not added to the core and interlayer (Comparative Examples 2-1 and 2-2). It is also clear from Table 10 that by adding carbon nanotube or carbon nanofiber to the core and/or interlayer of a three-piece golf ball formed from a rubber composition (Examples 2-1 to 2-6), the substantially the same excellent feel can be obtained as the balls wherein carbon nanotube or carbon nanofiber is not added to the core and interlayer (Comparative Examples 2-1 and 2-2).

In contrast, when fullerene is added to the core and interlayer (Comparative Example 2-3), the durability and carry distance are improved compared to a ball without carbon nanotubes or carbon nanofibers (Comparative Example 2-1); however, the impact feels harder.

< Three-Piece Golf Ball>

In Examples 3-1 to 3-9 and Comparative Examples 3-1 to 3-4, butadiene rubber compositions BR 1 to BR 5 as shown in Table 11 were used.

TABLE 11

| | Butadiene rubber (parts by weight; phr) | Zinc oxide (parts by weight; phr) | Barium sulfate (parts by weight; phr) | Dicumyl peroxide (parts by weight; phr) | Zinc acrylate (parts by weight; phr) | Anti-oxidant (Note 2) (parts by weight; phr) |
|---|---|---|---|---|---|---|
| BR 1 | 100 | 5 | 13 | 1 | 26 | 0.1 |
| BR 2 | 100 | 5 | 9 | 1 | 26 | 0.1 |
| BR 3 | 100 | 5 | 14 | 1 | 26 | 0.1 |
| BR 4 | 100 | 5 | 11 | 1 | 26 | 0.1 |
| BR 5 | 100 | 5 | 34 | 1 | 21 | 0.1 |

(Note 2)
2,2'-methylenebis-4-methyl-6-t-butylphenol was used as the anti-oxidant.

Table 12 shows the constituents components of the base materials for each layer of the balls of Examples 153-1 to 3-9 and Comparative Examples 3-1 to 3-4, and Table 13 shows the types of the carbon nanotubes and/or fullerenes in each layer, durability, carry distance, backspin and impact feeling.

TABLE 12

| | Core | Interlayer | Cover |
|---|---|---|---|
| Example 3-1 | BR 1 | BR 5 | Ionomer 2 |
| Example 3-2 | BR 1 | BR 5 | Ionomer 2 |
| Example 3-3 | BR 2 | BR 5 | Ionomer 2 |
| Example 3-4 | BR 3 | Polyurethane 1 | Ionomer 2 |
| Example 3-5 | BR 3 | Polyurethane 1 | Ionomer 2 |
| Example 3-6 | BR 2 | Ionomer 1 | Polyurethane 2 |
| Example 3-7 | BR 2 | BR 5 | Ionomer 2 |
| Example 3-8 | BR 1 | BR 5 | Ionomer 2 |
| Example 3-9 | BR 1 | BR 5 | Ionomer |
| Comp. Ex. 3-1 | BR 1 | BR 5 | Ionomer 2 |
| Comp. Ex. 3-2 | BR 1 | Ionomer 1 | Polyurethane 2 |

TABLE 12-continued

|  | Core | Interlayer | Cover |
|---|---|---|---|
| Comp. Ex. 3-3 | BR 2 | BR 5 | Ionomer 2 |
| Comp. Ex. 3-4 | BR 1 | BR 5 | Ionomer 2 |

Polyurethane 1: Elastollan ET 890
Polyurethane 2: Elastollan 1154D
Ionomer 1: Surlyn AD8269
Ionomer 2: Himilan 1605 + Himilan 1705

TABLE 13

|  | Carbon nanotubes and/or fullerenes | | | | | | | | |
|---|---|---|---|---|---|---|---|---|---|
|  | Inter-layer (phr) | Cover (phr) | Core weight (g) | Inter-layer weight (g) | Ball Weight (g) | Durability | Carry distance (m) | Back-spin (rpm) | Feel |
| Ex. 3-1 | — | Tube 2 phr | 28.55 | 36.97 | 45.69 | 100 | 201.1 | 2389 | 1.8 |
| Ex. 3-2 | — | Tube 1 phr | 28.55 | 36.97 | 45.69 | 99 | 199.8 | 2400 | 1.8 |
| Ex. 3-3 | — | Tube 8 phr | 28.07 | 36.49 | 45.48 | 100 | 201.4 | 2371 | 1.7 |
| Ex. 3-4 | Tube 2 phr | Tube 2 phr | 28.80 | 36.85 | 45.56 | 102 | 200.1 | 2387 | 1.8 |
| Ex. 3-5 | Tube 2 phr | — | 28.80 | 36.83 | 45.46 | 98 | 197.6 | 2561 | 1.9 |
| Ex. 3-6 | — | Tube 2 phr | 28.07 | 34.54 | 45.24 | 100 | 199.0 | 2504 | 1.9 |
| Ex. 3-7 | — | Fiber 2 phr | 28.07 | 36.49 | 45.22 | 98 | 199.8 | 2414 | 1.8 |
| Ex. 3-8 | Fiber 2 phr | — | 28.55 | 36.97 | 45.60 | 97 | 199.2 | 2501 | 1.7 |
| Ex. 3-9 | — | Fullerene 2 phr | 28.55 | 36.97 | 45.69 | 99 | 202.0 | 2168 | 1.6 |
| Comp Ex. 3-1 | — | — | 28.55 | 36.97 | 45.60 | 93 | 195.8 | 2451 | 1.8 |
| Comp. Ex. 3-2 | — | — | 28.55 | 35.02 | 45.62 | 89 | 191.5 | 2711 | 1.9 |
| Comp. Ex. 3-3 | — | Tube 10 phr | 28.07 | 36.49 | 45.56 | 92 | 200.8 | 2387 | 1.0 |
| Comp. Ex. 3-4 | — | Tube 0.05 phr | 28.55 | 36.97 | 45.60 | 93 | 199.7 | 2411 | 1.7 |

As is clear from Table 13, by adding carbon nanotube, carbon nanofiber and/or fullerene, singly or in combination, to an interlayer and/or cover of a three-piece golf ball formed from a resin composition in such a manner that the amount added thereof is not more than 8 parts by weight based on 100 parts by weight of base material resin (Examples 3-1 to 3-9), durability of a ball is significantly improved compared to the balls without these nano-materials (Comparative Examples 3-1 and 3-2).

It is also clear that by adding a suitable amount of carbon nanotubes to a cover formed from ionomer resin (Examples 3-1 to 3-3), carry distance is increased and amount of backspin is reduced compared to the balls without carbon nanotubes (Comparative Example 3-1). It is believed that the reduced amount of backspin is one of the factors contributing to the increased carry distance.

It is also clear that, by adding a suitable amount of carbon nanotubes to a cover formed from polyurethane resin (Example 3-6), carry distance is increased and backspin amount is reduced compared to a ball with a cover wherein carbon nanotubes are not added (Comparative Example 3-2). In this case, it is also assumed that the amount of reduced backspin is one of the factors contributing to the increased carry distance.

When an excess amount of carbon nanotube is added to the cover, such as 10 parts by weight based on 100 parts by weight of base material resin (Comparative Example 3-3), it is clear that the durability of the ball is lower than the case wherein a suitable amount (not more than 8 parts by weight of carbon nanotube based on 100 parts by weight of base material resin) of carbon nanotubes are added (Example 3-3). When the amount of the CNT added to the cover is very small, such as 0.05 part by weight based on 100 parts by weight of base material resin (Comparative Example 3-4), the durability thereof is lower than the case wherein a suitable amount of carbon nanotubes are added (Example 3-1).

The invention claimed is:
1. A high-strength golf ball, comprising:
  a core composed of a main core and, optionally, a sub-core having one or more layers;
  an interlayer having one or more layers formed on the outer surface of the core; and
  a cover having one or more layers formed on the outer surface of the interlayer;
  wherein at least one part of the core, the interlayer, and/or the cover contains at least one member selected from the group consisting of carbon nanotubes having a diameter of 0.8–70 nm and an L/D of 10–10000; carbon nanofibers having a diameter of more than 70 nm and not more than 200 nm and an L/D of 60–1000; cup-stacked-type carbon nanotubes having an outer diameter of 80–100 nm, an inner diameter of 50–70 nm, and an L/D of 10–5000; $C_{60}$, $C_{70}$, $C_{74}$, $C_{76}$, $C_{78}$, $C_{80}$, $C_{82}$, $C_{84}$ and $C_{85}$ fullerenes; and hydrides, hydroxides, alkylates and halides of such fullerenes, wherein at least one part of the core contains at least one member selected from the group consisting of the carbon nanotubes, carbon nanofibers and cup-stacked-type carbon nanotubes, wherein at least one layer of the interlayer contains at least one member selected from the group consisting of the carbon nanotubes, carbon nanofibers and cup-stacked-type carbon nanotubes, wherein at least one layer of the cover contains at least one member selected from the group consisting of the carbon nanotubes, carbon nanofibers, cup-stacked-type carbon nanotubes, fullerenes, and hydrides, hydroxides, alkylates and halides of such fullerenes, in which the core contains at least one member selected from the group consisting of the carbon nanotubes, the interlayer contains at least one member selected from the group consisting of the carbon nanofibers, the cover contains at least one member selected from the group consisting of the fullerenes, and hydrides, hydroxides, alkylates and halides of such fullerenes.

* * * * *